May 8, 1956 J. M. STOCKARD 2,744,484
CONNECTOR
Filed June 13, 1952
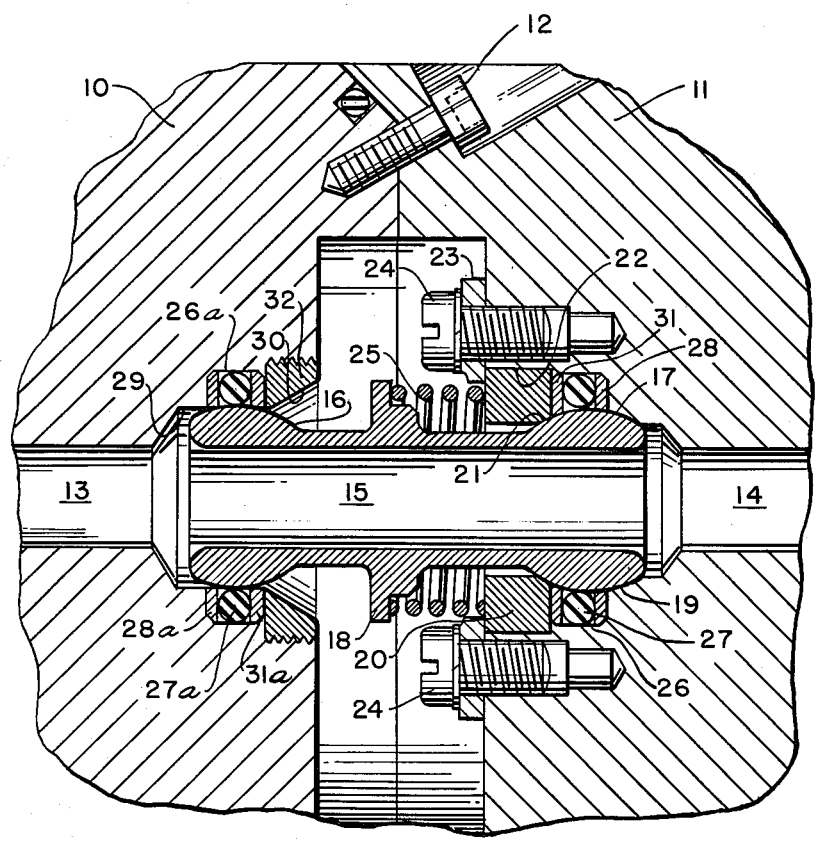
INVENTOR.
JOHN M. STOCKARD
BY
ATTORNEYS

United States Patent Office 2,744,484
Patented May 8, 1956

2,744,484

CONNECTOR

John M. Stockard, Washington, D. C., assignor to the United States of America as represented by the Secretary of the Navy Application June 13, 1952, Serial No. 293,493

5 Claims. (Cl. 114—20)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in conduit couplings.

One of the objects of the invention is to provide a push fit coupling device for readily connecting or disconnecting fluid conduits carried by juxtaposed members, which latter are required to be connected together in predetermined relationship.

Another object is to provide a coupling device which will connect the fluid conduits within a range of tolerance of misalignment.

The figure is a longitudinal section through the coupling device and a pair of juxtaposed members with which it is employed.

As an example of the invention, it will be assumed that members 10, 11 are adjacent cylindrical sections of a torpedo body detachably secured together by a plurality of angularly spaced bolts 12, the torpedo having fluid conduits 13, 14 which must communicate without leakage between adjacent terminal ends thereof when the two sections are secured together, this structure, being in general, conventional in the art.

The subject of the invention comprises an elongated tubular member 15 having enlarged portions 16, 17 at opposite ends thereof, each portion having a spherical outer surface, an annular flange 18 being disposed intermediate the ends of member 15.

Portion 17 abuts a correspondingly shaped spherical surface 19 in member 11 and is retained thereagainst by a split ring 20 formed of two semi-circular parts to permit assembly thereof in the space between portion 17 and flange 18 and having a spherical surface 21 abutting portion 17, the ring being disposed within a bore 22 and retained therein by a ring 23 secured to member 11 by a plurality of angularly spaced bolts 24 extending through ring 23 and threadedly engaging member 11. A compression spring 25 surrounds member 15, one end abutting ring 20 and the other abutting flange 18. An annular groove 26 is provided in member 11, surrounding portion 17, which contains an O ring 27 of resilient rubber-like material, such as neoprene or natural rubber, which is disposed between a pair of anti-extrusion annular washers 28 and 31 of rigid material, such as metal, disposed at opposite sides of the ring. Washer 28 is preferably an integral member and washer 31 is formed of two semi-circular parts, similar to ring 20, to permit assembly thereof.

Member 10 is provided with a straight bore 29 which receives spherical portion 16. A groove 26a similar to groove 26 is provided in member 10, this groove containing an O ring 27a and anti-extrusion washers 28a and 31a. Washer 28a is of metal, like washer 28. Washer 31a differs from washer 31, however, in that it is preferably formed of flexible material, such as treated leather or the like rather than metal, and is also integral rather than two piece. A retaining ring 32 threadedly engages member 10 and retains the O rings and washers just described in position in member 10, the retaining ring having a tapered mouth 30.

With members 10, 11 separated, spring 25 will maintain the longitudinal axis of coupling 15 substantially aligned with the longitudinal axis of conduit 14. As members 10 and 11 are moved relatively in the direction of the longitudinal axes of conduits 13, 14, spherical portion 16 will enter mouth 30 and thence move into bore 29 into the position shown wherein it engages O ring 27a and anti-extrusion washers 28a, 31a adjacent thereto. Due to the spherical shape of portion 16 the latter will effect a seal with the O ring and anti-extrusion washers even though the longitudinal axes of conduits 13, 14 are somewhat misaligned; also, it will effect a seal with some axial displacement of portion 16 relative to its O ring, that is, there is some axial tolerance of the position of this O ring along portion 16. The anti-extrusion washers are for preventing extrusion of the O ring through the wedge shape annuli formed between the side walls of the O ring grooves and the outer surface of portion 16 or 17, these being preferable when the pressure in the conduits is high. It will be apparent that they may be omitted, however, when the anti-extrusion feature is not essential and their grooves narrowed to fit same.

Obviously many modifications and variations of the present invention are possible in the light of the above teachings. It is therefore to be understood that within the scope of the appended claims the invention may be practiced otherwise than as specifically described.

What I claim is:

1. A torpedo of the type including a first torpedo section having a first terminal end of a conduit carried thereby and a second torpedo section having a second terminal end of a conduit carried thereby, said sections being separable and said ends being disposed in substantially aligned spaced relationship when said sections are secured together, the improvements in combination with said torpedo, comprising; a conduit connector disposed between said terminal ends, said connector having first and second spherical outer surfaces, one being at each end thereof, means carried by the first section adjacent said first terminal end receiving the first spherical surface and securing the connector thereto for pivotal movement in all directions about the point of pivotation of said first spherical surface, fluid seal means between the first spherical surface and the first section for preventing fluid leakage by same, spring means for maintaining the connector in a desired projecting position from the first section, a bore in the second section adjacent said second terminal end into which the second spherical surface is adapted to move when the members are relatively moved to their secured position, and an O ring surrounding the bore and engaging the second spherical surface for preventing fluid leakage past the O ring.

2. A torpedo having a pair of juxtaposed body sections adapted to be secured together, conduit means carried by each section having terminal ends disposed in spaced substantially aligned relation when the sections are secured together, and a conduit connector disposed between said terminal ends, said connector having one end secured to one of the sections for pivotal movement in all directions about the point of pivotation of said end, means for preventing free pivotation of said connector and maintaining it in a projecting and substantially aligned position relative to an axis extending between said conduit ends, means carried by the other section telescopically receiving the other end of the connector, and means for preventing fluid leakage past said other end.

3. Apparatus in accordance with claim 2 wherein said other end is provided with a spherical surface disposed within a bore in said other section.

4. Apparatus in accordance with claim 2 wherein said means for preventing free pivotation includes a spring.

5. Apparatus in accordance with claim 2 wherein said means telescopically receiving the other end of the connector includes a conical mouth adjacent thereto for receiving and guiding said other end of the connector therein.

References Cited in the file of this patent

UNITED STATES PATENTS

| | | |
|---|---|---|
| 99,003 | Robbins | Jan. 18, 1870 |
| 1,500,921 | Bramson et al. | July 8, 1924 |
| 1,669,949 | Reynolds | May 15, 1928 |
| 1,748,817 | Zerk | Feb. 25, 1930 |
| 2,564,938 | Warren | Aug. 21, 1951 |